United States Patent [19]

Whalen, Jr.

[11] 3,866,897
[45] Feb. 18, 1975

[54] COMBINED VICE AND SAW GUIDE

[76] Inventor: Raymond Stephen Whalen, Jr., 10625 Itzamana Rd., La Mesa, Calif. 92041

[22] Filed: Jan. 14, 1974

[21] Appl. No.: 427,434

[52] U.S. Cl. .............................. 269/87.2, 269/258
[51] Int. Cl. ............................................. B23q 3/06
[58] Field of Search .......... 83/435.1, 445, 454, 465, 83/764, 765; 269/1, 2, 87.1, 87.2, 87.3, 282, 265, 321 N, 258

[56] References Cited
UNITED STATES PATENTS

| | | | |
|---|---|---|---|
| 1,954,708 | 4/1934 | Mass | 269/87.2 |
| 2,103,074 | 12/1937 | Gardner | 269/87.2 |
| 2,432,352 | 12/1947 | Strotz | 269/282 |
| 2,838,081 | 6/1958 | Larson | 269/265 |

FOREIGN PATENTS OR APPLICATIONS

| 1,098,911 | 3/1955 | France | 269/265 |
|---|---|---|---|

Primary Examiner—Roy Lake
Assistant Examiner—Mark S. Bicks
Attorney, Agent, or Firm—Brown & Martin

[57] ABSTRACT

A vice that firmly holds a work piece between flat substantially parallel jaws. A saw access guide together with an opening in the fixed jaw and base makes it possible for the device to be maneuvered on the table of a band saw so that the saw severs the work piece while the vice holds the work piece firmly clamped.

6 Claims, 4 Drawing Figures

PATENTED FEB 18 1975　　　　　　　　　　　　　　3,866,897

COMBINED VICE AND SAW GUIDE

BACKGROUND OF THE INVENTION

The safety hazard associated with operating a band saw has been known for many years. The problem becomes particularly acute with short length stock that is to be cut off by the vertically moving band saw. In order to saw such stock it has been necessary in the past to hold the stock manually and thus the users hands are very close to the saw blade. The necessary proximity to the saw blade complicates the problem of providing any safety protection and increases the hazard substantially.

In other sawing operations various devices have developed for holding a work piece, including some with slots which permit at least partial severing of a clamped part. However, these prior art devices were not adaptable to the band saw working environment.

Other clamps or vices have been proposed whereby two or more widely spaced clamps are utilized to hold for example a piece of circular stock in position, so that a saw may be used to cut the work piece intermediate the clamped portions. However, such devices have been sufficiently bulky and difficult to use that they have not enjoyed widespread utilization.

It is therefore desirable to have a vice for use on band saws that permits short length stock to be cut off, with both of the resulting pieces remaining firmly clamped before and after severing. Such a device is particularly desirable where it is adapted to other uses, and where it is easily maneuverable on the bed of a band saw with the facility for handling a wide variety of stock sizes and cut-off angles.

SUMMARY OF THE INVENTION

An examplary embodiment of the invention overcomes the aforementioned deficiencies by providing a combined vice and saw guide that firmly clamps the work piece between a fixed and movable jaw and holds both pieces of the severed work piece firmly in position while being easily maneuverable on a bed of a band saw to accomplish rapid operation and to enable various cut-off angles.

The device according to the exemplary embodiment comprises a substantially rectangular base portion. The bottom surface of the base has substantial planer extent so it rests securely on the flat bed of a band saw and yet may be easily slid on the surface into association with the saw blade. At the narrow end of the substantially rectangular base there is mounted a fixed jaw. Both the fixed jaw and the base are cut away to form a substantially V-shaped saw access guide. The V-shaped access guide communicates with an opening through the base and fixed jaw so that the saw blade may enter through the guide and opening and cut through the workpiece toward a movable jaw. The movable jaw is mounted for movement toward and away from the fixed jaw by a jack screw received in the movable jaw by a ball and socket joint and having a second end fitted with an operating handle. Intermediate the ends of the jack screw member is a screw block pivotally mounted on the base. The ball and socket combined with the pivoting action of the screw block permits the substantially planer front face of the movable jaw to compensate for any out-of-parallelism of the work piece, and to firmly clamp such an irregularly shaped work piece in position. The movable jaw is guided in a slot through the base, which slot also provides access for the saw blade.

Thus it is possible with the device for the operator to clamp a work piece in position and then to slide the device on the bed of the band saw so that the saw enters through the saw access guide and opening. The work piece is then severed by further pressure and movement of the device until the saw blade contacts the movable jaw, thereby completing the severing of the work piece. The V-shape of the fixed jaw permits saw blade entry angles up to approximately 45° from the perpendicular, thus permitting a wide range of cut-off angulation.

It is therefore an object of the invention to provide a new and improved combined vice and saw guide.

It is another object of the invention to provide a new and improved combined vice and saw guide that reduces the hazard of band saw operations.

It is another object of the invention to provide a new and improved vice and saw guide that is susceptible to multiple uses.

It is another object of the invention to provide a new and improved combined vice and saw guide which is simple in construction and relatively low in manufacturing cost.

It is another object of the invention to provide a new and improved vice and saw guide which reduces the possibility of blade damage.

It is another object of the invention to provide a new and improved vice and saw guide which firmly holds the work piece before and after severing.

It is another object of the invention to provide a new and improved combined vice and saw guide which reduces the production of the defective parts.

Other objects and many attendant advantages will become more apparent upon a reading of the following detailed description. Together with the drawings, in which like reference numerals refer to like parts throughout and in which.

Figure 1:
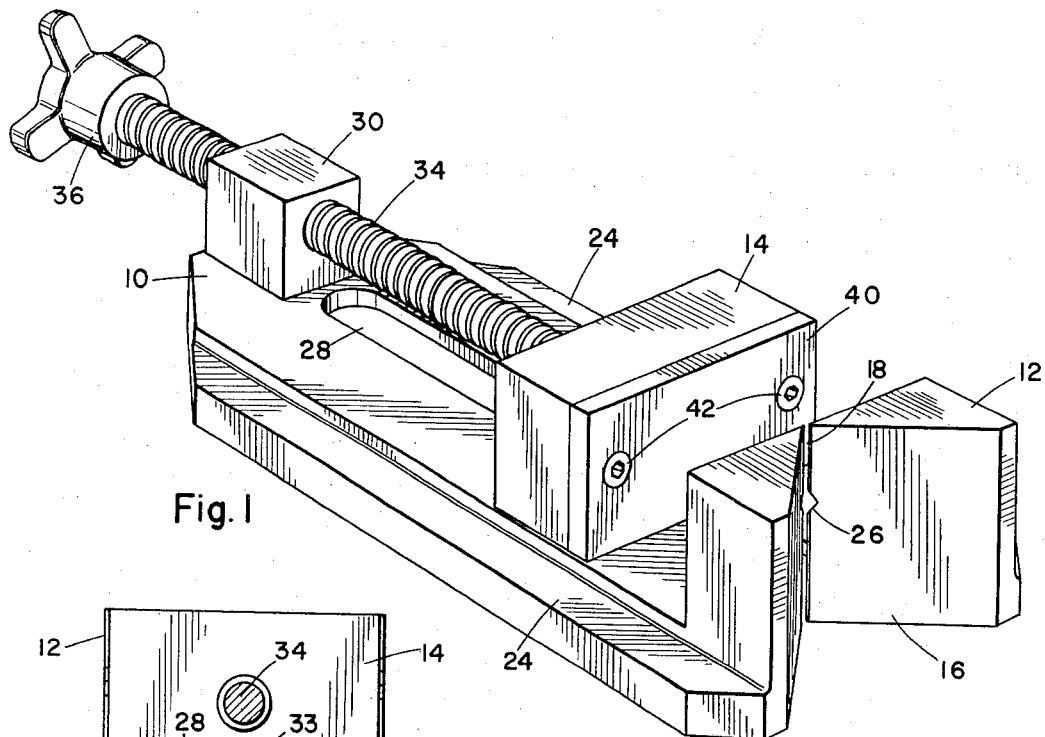
FIG. 1 is a perspective view of the complete vice.
Figure 4:
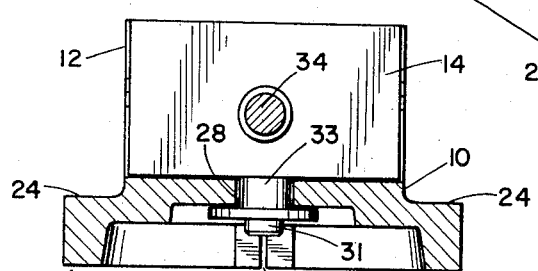
FIG. 4 is a sectional view taken on line 4—4 of FIG. 3.
Figure 2:
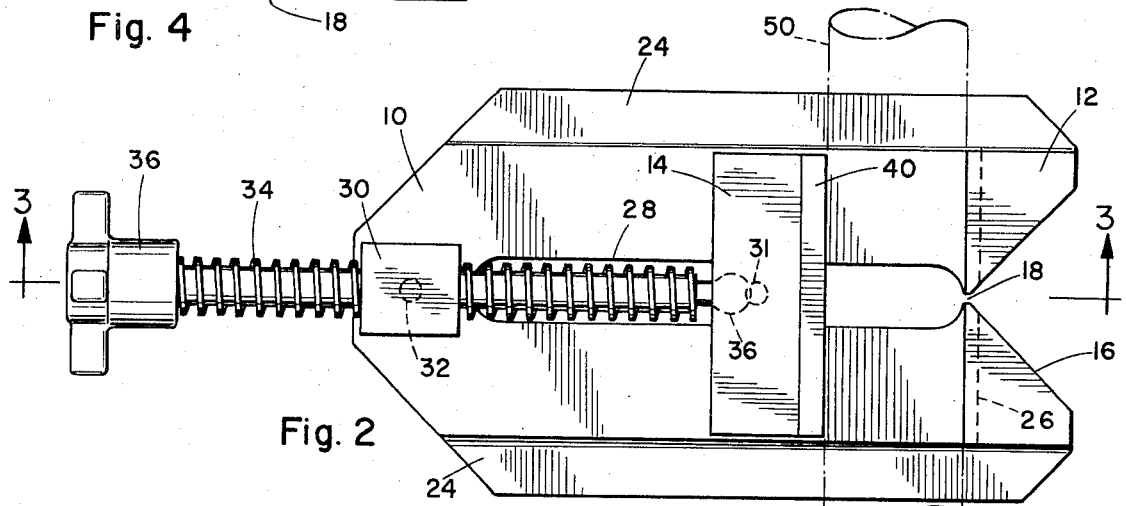
FIG. 2 is a top plan view.
Figure 3:
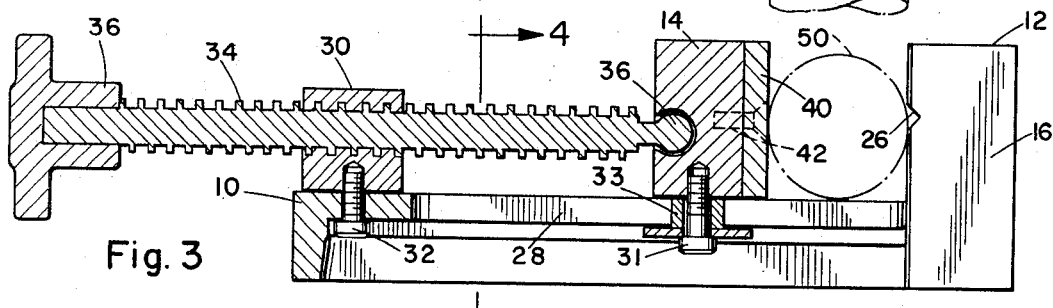
FIG. 3 is a sectional view taken on line 3—3 of FIG. 2.

Referring now to the drawings, there is illustrated a combined vice and saw guide according to the invention. A base 10 mounts a fixed jaw 12 and a movable jaw 14. The base is substantially rectangular in configuration and has flanged clamp portions 24 along its long edges. These portions are utilized to hold the device in position such as on a milling machine, band saw or similar machine tool. The fixed jaw is mounted across one narrow end of the substantially rectangularly shaped base 10. Both the fixed jaw and base are cut away to form a V-shaped saw access guide 16. The apex of the saw access guide 16 terminates in an opening 18 which extends vertically over the entire height of the base and fixed jaw to permit the entry of the saw blade into the proximity of the movable jaw 14. A slot 28 extends along the base and into association with the opening 18, so the saw blade may pass along the base without cutting it over the entire range of the clamped part sizes.

The movable jaw 14 is guided in the slot 28 by a screw 31 secured through a spacer 33 riding in the slot. The movable jaw is positioned by a jack screw 34 which is connected to movable jaw 14 by a spherical head member 36. The spherical joint created by the head 36 and corresponding cavity in the movable jaw 14 produces a self-aligning action that permits the movable jaw to accept parts which are out-of-parallelism by as much as ten degrees or more. The jack-screw 34 is carried intermediate its ends in a screw block 30 which is screw threaded to receive the threaded portion of jack-screw 34 and is pivotally mounted to the base 10 by a bolt 32. A slight pivotal movement in the screw block 30 permits the movable jaw to accept the out-of-parallelsim as previously described. An operating handle 36 on the end of the jack-screw 34 permits the jack-screw to be rotated by the user to move the movable jaw 14 toward and away from the fixed jaw 12.

The front face of the movable jaw 14 mounts a wear plate 40. The wear plate 40 forms a consumable member which can be replaced after it is sufficiently grooved by the severing operation to no longer be serviceable. The wear plate 40 is secured to the main body 38 of the movable of the movable jaw 14 by a plurality of fasteners 42. The fixed jaw has a V-shaped slot 26 extending horizontally across the width of the substantially rectangular base, to permit the clamping of small diameter circular stock between the movable jaw and the V-shaped slot in the fixed jaw.

OPERATION

In use the operator places the work piece 50, which may comprise a short length of circular stock, between the movable jaw 14 and the fixed jaw 12. The operator then tightens the movable jaw 14 against the fixed jaw 12 by the operation of the jack-screw 34 through the operating handle 36. Thus the movable jaw 14 firmly holds the stock in position. If the stock is not aligned, that is the stock, for example, is not truly cylindrical but tapers from one end to the other, the movable jaw will compensate for this misalignment by aligning itself with the side of the stock facing the movable jaw and still maintain firm contact over the entire work piece surface. The alignment of the movable jaw 14 takes place by a rotation about a substantially vertical axis through the spherical joint, comprising the spherical member 36. It is this same spherical member that permits the rotation of the jack-screw 34. With the device firmly clamped, the operator can move the entire vice toward the band saw keeping his hands well out of the reach of the saw blade. The wide opening of the saw access guide permits substantial mis-alignment of the device without permitting the vice to pass the blade entirely. The guide had a tendency to direct the saw blade into the saw access opening so that the saw blade is guided into contact with the work piece at the selected point for servering. Since the saw access guide is substantially V-shaped the operator may angulate the base of the vice and attain a cut-off angle other than the normally perpendicular cut.

The severing continues until the blade fully penetrates the work piece. This operating will normally result in the saw contacting the wear place 40 on the movable jaw 14 and thus after a large number of operations it will be desirable to remove the wear plate 40 and replace it with a new consumable plate. After severing, both portions of the work piece remain firmly clamped into position and thus there is no tendency for the saw blade to become damaged by flying stock or during the retraction of the saw blade from the slot produced during severing.

It will be understood that in addition to the above described uses, the invention is useful in a wide variety of machining operations including milling and drilling.

Having described my invention, I now claim:

1. A vice for holding a work piece during metal working operations including severing of the work piece by a band saw comprising,
   a base means including a generally planer under surface for support from and movement on a band saw table,
   a fixed jaw extending generally vertically upwardly from said base and fixed at one end of said base,
   said base and said fixed jaw being cut away to form a substantially V-shaped saw access guide,
   said jaw access guide extending over the entire vertical extent of said base and said fixed jaw and terminating in a saw access guide opening,
   a slot extending along a substantial portion of said base connecting with said saw access guide opening,
   a movable jaw mounted on said base for movement toward and away from said fixed jaw, having a vertical generally planer clamping surface,
   whereby a work piece clamped between said fixed jaw and said movable jaw may be entirely severed by a vertically running and horizontally cutting saw blade guided in said opening by movement of said base on said band saw table.

2. A vice according to claim 1 wherein:
   the working face of said fixed jaw contains a small stock holding slot extending horizontally along said working face.

3. A vice according to claim 1 wherein:
   said movable jaw is mounted for limited rotation about a vertical axis.

4. A vice according to claim 1 wherein,
   the entry angle of said V-shaped saw access guide is substantially 90°.

5. A vice according to claim 1 wherein,
   said movable jaw is engaged by a jack screw extending horizontally over said base and received in a screw block pivotally mounted on said base adjacent the end opposite said fixed jaw.

6. A vice according to claim 1 wherein,
   said movable jaw is engaged by a jack screw mounted for rotation on said base,
   said movable jaw being guided for movement toward and away from said fixed jaw by means connected to said movable jaw and received in said slot in said base.

* * * * *